(12) United States Patent
Knoll et al.

(10) Patent No.: US 11,478,932 B2
(45) Date of Patent: Oct. 25, 2022

(54) HANDLING ASSEMBLY COMPRISING A HANDLING DEVICE FOR CARRYING OUT AT LEAST ONE WORK STEP, METHOD, AND COMPUTER PROGRAM

(71) Applicant: Robert Bosch GmbH, Stuttgart (DE)

(72) Inventors: Christian Knoll, Stuttgart (DE); Corinna Pfeiffer-Scheer, Markgroeningen (DE); Dieter Kunz, Ditzingen (DE); Jens Hofele, Lenningen (DE); Peter Schlaich, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 85 days.

(21) Appl. No.: 16/636,497

(22) PCT Filed: Jun. 18, 2018

(86) PCT No.: PCT/EP2018/066083
§ 371 (c)(1),
(2) Date: Feb. 4, 2020

(87) PCT Pub. No.: WO2019/029878
PCT Pub. Date: Feb. 14, 2019

(65) Prior Publication Data
US 2020/0246974 A1    Aug. 6, 2020

(30) Foreign Application Priority Data

Aug. 7, 2017 (DE) .......................... 102017213658.8

(51) Int. Cl.
*B25J 9/16* (2006.01)
(52) U.S. Cl.
CPC ........... *B25J 9/1671* (2013.01); *B25J 9/1664* (2013.01); *B25J 9/1697* (2013.01);
(Continued)

(58) Field of Classification Search
CPC ...... B25J 9/1697; B25J 9/0093; B25J 9/0096; B25J 9/1664; B25J 9/1666; B25J 9/1671;
(Continued)

(56) References Cited

U.S. PATENT DOCUMENTS 10,296,602 B1 * 5/2019 Cooper ............... G06F 16/5866
2004/0260563 A1 12/2004 Hashimoto et al.
(Continued)

FOREIGN PATENT DOCUMENTS

CN    102939188 A    2/2013
CN    103260834 A    8/2013
(Continued)

OTHER PUBLICATIONS

Thomason, Jesse, "Continuously Improving Natural Language Understanding for Robotic Systems through Semantic Parsing, Dialog, and Multi-modal Perception," Nov. 23, 2016, Doctoral Dissertation Proposal, University of Texas at Austin (Year: 2016).*
(Continued)

*Primary Examiner* — Spencer D Patton
(74) *Attorney, Agent, or Firm* — Norton Rose Fulbright US LLP; Gerard Messina (57) ABSTRACT

A handling assembly having a handling device for carrying out at least one working step with and/or on a workpiece in a working region of the handling device, stations being situated in the working region, with at least one monitoring sensor for the optical monitoring of the working region and for provision as monitoring data, with a localization module, the localization module being designed to recognize the stations and to determine a station position for each of the stations.

15 Claims, 3 Drawing Sheets

(52) U.S. Cl.
CPC .............. *G05B 2219/39441* (2013.01); *G05B 2219/40097* (2013.01); *G05B 2219/40099* (2013.01); *G05B 2219/40323* (2013.01); *G05B 2219/40607* (2013.01)

(58) Field of Classification Search
CPC ......... B25J 9/1656; G05B 2219/40097; G05B 2219/40099; G05B 2219/40323; G05B 2219/40607; G05B 2219/39441
See application file for complete search history.

(56) References Cited

U.S. PATENT DOCUMENTS

| | | | |
|---|---|---|---|
| 2008/0091301 | A1 | 4/2008 | Brantmark |
| 2012/0290130 | A1* | 11/2012 | Kapoor .................. B25J 9/1671 700/247 |
| 2014/0277737 | A1* | 9/2014 | Sekiyama ............ G05B 19/425 700/259 |
| 2014/0288711 | A1* | 9/2014 | Sawada .................. B25J 9/1671 700/259 |
| 2019/0030716 | A1* | 1/2019 | Chevallereau ......... B25J 9/1676 |

FOREIGN PATENT DOCUMENTS

| | | |
|---|---|---|
| CN | 104428107 A | 3/2015 |
| CN | 106256512 A | 12/2016 |
| DE | 102004032996 A1 | 2/2006 |
| DE | 102016002781 A1 | 8/2016 |
| JP | S63306894 A | 12/1988 |
| JP | H11226889 A | 8/1999 |
| JP | 2003222295 A | 8/2003 |
| JP | 2004243427 A | 9/2004 |
| JP | 2010208002 A | 9/2010 |
| JP | 2011125975 A | 6/2011 |
| JP | 201230320 A | 2/2012 |
| JP | 2012030320 A * | 2/2012 |
| JP | 2014188645 A | 10/2014 |
| WO | 2006043873 A1 | 4/2006 |
| WO | WO-2006043873 A1 * | 4/2006 ....... G05B 19/41825 |
| WO | 2017098713 A1 | 6/2017 |

OTHER PUBLICATIONS

Hebert, et al. "Combined Shape, Appearance and Silhouette for Simultaneous Manipulator and Object Tracking," May 2012, IEEE International Conference on Robotics and Automation, pp. 2405-2412 (Year: 2012).*

International Search Report for PCT/EP2018/066083, dated Sep. 4, 2018.

Delden and Overcash: "Towards Voice-Guided Robotic Manipulator Jogging", Proceedings of the 12th World Multiconference on Systemics, Cybernetics and Informatics, (2008), pp. 1-6, XP055868043.

Rogowski, Adam: "Robotized cell remote control using voice commands in natural language", 2010 15th International Conference on Methods and Models in Automation and Robotics, (2010), pp. 383-386, XP031764453.

* cited by examiner

HANDLING ASSEMBLY COMPRISING A HANDLING DEVICE FOR CARRYING OUT AT LEAST ONE WORK STEP, METHOD, AND COMPUTER PROGRAM

FIELD

A handling assembly is provided having a handling device for carrying out at least one work step with and/or on a workpiece in a working region of the handling device, stations being situated in the working region, having at least one monitoring sensor for the optical monitoring of the working region and for provision as monitoring data. In addition, a method and a corresponding computer program are provided.

BACKGROUND INFORMATION

Handling devices, such as industrial robots, are frequently used in industrial production. A program of an industrial robot defines the spatial position and orientation of points in space that the robot traverses in a temporal and/or logical sequence. Through a position-dependent chaining of switching signals, tools, for example grippers, weld torches, or dispensers, are controlled, and in this way various applications can be handled by one robot.

The conventional training methods today for handling devices can be roughly classified into online programming and off-line programming:

Online programming is distinguished in that the handling device is moved manually to target positions using a manual operating device, and after being reached these positions are stored in the control unit. Alternatively, some robot kinematic systems offer the possibility of switching off force to the arm and training the points in space through direct guiding of the arm. The definition of the sequences is done in particular through source code programming.

Off-line programming is distinguished in that construction models, for example CAD models, of the handling device and of the complete manufacturing environment are stored. In a simulated environment, analogous to online programming, the mechanisms of the online programming are carried out virtually, or movement points are derived directly from the CAD model.

German Patent Application No. DE 10 2016 002 781 A1 describes a work station for carrying out at least one work process with at least one robot that has a plurality of robot axles connected to one another in articulated fashion and movable relative to one another, a cart having floor contact elements via which the cart can be moved along a floor, and at least one work plate that has a plurality of fastening elements by which the robot can be fastened on the work plate in different positions.

SUMMARY

The present invention provides an example handling assembly having a handling device for carrying out at least one work step. In addition, an example method for carrying out a work step, and an example computer program for carrying out the example method, are provided in accordance with the present invention. Preferred and/or advantageous specific embodiments of the present invention are described herein and are shown in the figures.

According to the present invention, an example handling assembly is provided having a handling device for carrying out at least one work step with a workpiece and/or on a workpiece, in a working region of the handling device. The handling assembly includes at least one handling device, or alternatively a plurality of handling devices. In particular, it is provided that the handling device is situated in stationary fashion in the working region; alternatively, the handling device is movable in the working region. The handling device is in particular a robot. The handling device is specifically a multi-arm robot, for example a two-arm robot or a three-arm robot. Particularly preferably, the handling device is a multi-axle robot, the multi-axle robot preferably having at least three axles and/or being movable and/or rotatable about these axles. Optionally, the handling device is for example a collaborating and/or cooperating robot. The handling device is for example designed to work together with a further handling device, in particular of the same type, in order to carry out the work step, and/or to work together with a human in order to carry out the work step.

The handling device is in particular designed to carry out the work step in the working region. The working region is for example a production floor or a production segment. The working region is preferably a three-dimensional spatial region. Particularly preferably, the handling device is situated in the working region.

The workpiece is for example a component and/or a part to be processed. The handling device is for example designed to grasp and/or to process the workpiece, in particular using processing elements of the handling device and/or of a station. For example, the handling device is designed to grip the workpiece, to process it, for example to drill it, grind it, weld it, and/or to put down the workpiece. Alternatively and/or in addition, the handling device is designed to process, join, and/or transport a plurality of workpieces.

At least one station is situated in the working region of the handling device. The station is situated in stationary fashion in the working region; alternatively, the station is situated in the working region in mobile fashion. Stations are in particular flat and/or spatial segments of the working region of the handling device. The station is in particular a processing station, for example a station at which the workpiece can be processed. Alternatively and/or in addition, the station is a location at which the workpiece is made available, for example a pallet with raw parts, and/or the station is a station at which a finally processed workpiece can be deposited, such as a pallet. For example, a distinction is made between workpiece sources and workpiece end points.

The handling assembly includes at least one monitoring sensor. The monitoring sensor is preferably situated in stationary fashion; alternatively, the monitoring sensor is manually guided, robotically guided, or is situated in movable fashion in the working region in some other way. The monitoring sensor is designed for the optical monitoring of the working region, the optical monitoring being provided as monitoring data. The monitoring sensor is preferably a 3D sensor, for example a stereo camera. Preferably, the monitoring sensor is a monitoring camera, for example a video camera or a still camera. The monitoring camera is for example a black-and-white camera or a color camera, the latter being in particular a CCD camera or CMOS camera. The monitoring data including particular images from the optical monitoring of the working region. In particular, the images are also called monitoring images. In addition, it is possible for the handling assembly to have a plurality of monitoring sensors, the monitoring sensors being configured and/or designed such that they image the same segments, with partial overlapping, and that in this way the optical monitoring of the various monitoring sensors can be combined to form a global monitoring of the working region.

The handling assembly includes a localization module. The localization module is for example a processor module, a microcontroller, or a computing unit. In particular, the localization module has a data connection to the monitoring sensor, the monitoring data being provided to the localization module. The localization module is designed to evaluate and/or assess the monitoring data.

The localization module is designed to recognize the stations, in particular based on and/or in the monitoring data. In particular, the localization module recognizes the stations in the monitoring data, for example in the monitoring images of the monitoring area, and/or can assign the location of the stations in the working area. In addition, the localization module is designed to determine a position of the station as the station position based on the monitoring data for a recognized station. In addition, it can be provided that the localization module is designed to also determine the presence and/or a position of the workpieces in the station. For example, the localization module checks for a presence of workpieces in the stations, in particular in a pallet or in a nest, the handling device preferably then handling only completely filled workpieces. Alternatively and/or in addition, the localization module can be designed to determine the absolute position of the workpiece in the station. In particular, the determination of the station position can be a determination with an accuracy better than one millimeter. The localization module is in particular designed to recognize the stations permanently and/or in cyclical fashion, and/or to determine the station positions permanently and/or in cyclical fashion. For example, the localization module is designed to determine the station position at least five times during the work step.

In accordance with an embodiment of the present invention, a example handling assembly is provided having a handling device that trains and/or initializes a handling device, in particular a multi-arm robot, in time-saving fashion, so that in particular an expert is not required. In particular, the present invention provides an example handling device that enables a rapid initialization of a multi-axle robot having more than three axles. In particular, this is enabled in that the stations in the working region can be recognized largely automatically using a 3D sensor, and the handling device can carry this out.

In a possible embodiment of the present invention, the localization module includes a training module having training data. In particular, the training data can be provided to the training module and/or can be stored therein. The training data are preferably image data. For example, training data are images in which stations can be seen having standard geometries, shapes, and/or dimensions. The training module is designed to determine recognition features for detecting the stations, based on the training data. For example, the recognition features are the geometry, the dimension, the shape, the structure, the contrast, and/or further properties of the stations. The station recognition data include the recognition features. The station recognition data include in particular items of information as to how stations can be found and/or detected in the monitoring data and/or the optical monitoring of the working region. The localization module is designed to recognize the stations based on the station recognition data. The recognition features can be used in particular to classify elements in the monitoring data, in the images of the working region, and/or in a model of the working region.

The training module is preferably designed to determine the recognition features based on machine learning. For example, the training module is designed as a neural network. Alternatively and/or in addition, the training module is designed to extract the recognition features from the training data via supervised learning, partly supervised learning, and/or via reinforcement learning. This embodiment is based on the idea of providing a universally usable handling assembly that recognizes the stations in different working regions.

Optionally, it is provided that the handling assembly includes a model production module. The model production module is designed to generate a model of the working region. The model of the working region is in particular a 3D model. Preferably, the model of the working region is a CAD model. Specifically, the model is a model produced by the sensor and/or a model based on the monitoring data. The model of the working region includes in particular the position of the stations and/or the position of the handling device in the working region.

The handling device includes a display unit for displaying the model. The display unit is for example a monitor, and specifically a touchscreen monitor via which a user can input data and/or select things. The display unit is designed for the graphic and/or pictorial, two-dimensional or three-dimensional display of the model.

Optionally, it is provided that segments can be selected by a user in the displayed model as additional recognition features. For example, the user can select regions and/or segments in the model that the user recognizes and/or identifies as stations. The selected additional features are included in the processing recognition data. In particular, the user can also expand known stations if these stations for example have not been completely acquired and/or recognized. This embodiment is based the user sharing and/or training additional information and/or stations of the handling assembly that have not been recognized.

An embodiment of the present invention provides that the handling assembly includes a control module. The control module is in particular a computing unit, a processor, or a microcontroller. The control module is designed to control the handling device to carry out a work step based on the station position and/or positions. In particular, the control module is designed to control the handling device for the carrying out of exactly one work step and/or a multiplicity of work steps, based on the station positions. For example, the control module is designed to control the handling device to move and/or transport the workpiece from a first station position to a second station position. In particular, work steps are processes that begin at a first station having a first station position and end at a second station having a second station position. In addition, it can be possible to travel to and/or integrate further stations, having further station positions, between the first station and the second station. This embodiment is based on the idea of providing a handling assembly that can automatically plan the processes, this planning being based on the station positions that have been determined by the localization module.

The handling assembly preferably includes a task definition module. The task definition module is a computing unit, a processor, or a microcontroller. In particular, the task definition module can be part of the control module. The task definition module is designed so that the user can select and/or define the work step, in particular so that the work step can be semantically defined and/or selected. Alternatively and/or in addition, the selection and/or the definition of the work step is possible using the optical representation on a and/or the display unit. In particular, the definition and/or the selection of the work step takes place through a description and/or definition of the initial state and the target state, such as the definition of the first station and the definition and/or determination of the second station. For example, this definition of the work step is achieved through a selection of a work piece source and a workpiece end point, a station being assigned to the workpiece sources and another station being assigned to the workpiece end point. The selection and/or definition by the user can specifically be done purely textually, for example "move all workpieces from pallet A to pallet B." Preferably, the first station can be selected optically on the display unit, and in particular the second station is also selectable on the display unit. This embodiment is based on the idea of providing a handling assembly in which a software expert is not required for the determination of a process and/or of a work step.

Particularly preferably, the work step has at least two parameters that are to be defined. In particular, the work step has exactly two parameters to be defined; alternatively, the work step has a plurality of parameters to be defined. The two parameters to be defined include a start position and an end position. In particular, the user can select one of the stations in the displayed model as start position, and a further station and/or the same station can be selected in the displayed model as and position. Here it is in particular provided that the work step having the two parameters to be defined begins at the start position and ends at the end position.

Optionally, it is provided that after termination of the work step the workpiece is in an end position. In particular, the end position is defined as a point in three-dimensional space, and an angular position can be assigned to the workpiece at this point, for example using Euler angles. In particular, the end position can be selected by the user using the task planning module. For example, in the task definition module the user can set and/or select the position, in particular optically, in the form of coordinates and angular position. Preferably, the task planning module is designed to determine the deposition point of the workpiece based on the monitoring data, for example based on a fitting algorithm. In particular, it is provided that, for the case in which the fitting algorithm ascertains a plurality of deposition possibilities, the user can select the preferred deposition location.

Particularly preferably, the handling assembly includes a safety module. The safety module is preferably a computing unit, a processor, or a microchip. The safety module has a data connection to the monitoring sensor in order to take over the monitoring data during the work step. In particular, the safety module is provided with the monitoring data of the monitoring sensor in cyclical fashion, for example once per second or once every ten seconds. The safety module is designed to control the assembly device based on changes in the monitoring region. For example, the safety module is designed to react when the configuration of the stations in the working region of the handling device changes, the safety module for example controlling the localization module to make a new determination of the station positions for this purpose.

Alternatively and/or in addition, the safety module is designed to recognize when a human being is situated in the working region of the handling device, the safety module recognizing in particular whether there is a risk of injury to the human being, and, upon detection of the human being and/or when there is a risk of injury to the human being, the safety module being designed to halt the handling device. In addition, the safety module can be designed to control the handling device to resume and/or continue the work step when the human being leaves the working region of the handling device. This embodiment is based on providing a particularly safe handling assembly.

In an embodiment of the present invention, it is provided that the handling assembly includes a path planning module. The path planning module is a computing unit, a processor, or a microchip. The path planning module is designed to determine a trajectory of the handling device and/or of the workpiece, the trajectory being the spatiotemporal path of the workpiece during the carrying out of the work step. In particular, the path planning module is designed to determine the trajectory of the handling device and/or of the workpiece so as to be collision-free, where "collision-free" relates in particular to the avoidance of a collision of the workpiece with the handling device and/or with objects in the working region of the handling device. Alternatively and/or in addition, the path planning module is designed to exclude a collision between a first arm and a second arm of the handling device. In particular, the determination of the trajectory of the handling device by the path planning module is done based on the station positions and/or the monitoring data of the monitoring sensor.

Particularly preferably, the handling assembly includes a testing module. The testing module includes, in particular, rules. The rules can in particular be defined by a user and/or can be stored in the testing module. The rules include for example properties of the workpiece and/or of the stations. For example, a rule may state: "do not tilt the workpiece in this or that direction." Further examples of rules: "do not put down the workpiece if it does not lie horizontally" or "do not process the workpiece until the cover of the workpiece has been removed." The testing module is designed to control the handling device in order to carry out and/or to terminate the work step based on the following of the rules. For example, the testing module is designed to halt the work step and/or the handling device when a rule has not been followed.

A particularly preferred embodiment of the present invention provides that the handling assembly includes an additional sensor for the fine resolution of a segment of the working region and/or of the overall working region. The additional sensor is for example a feeler, a camera, or a laser scanner. The additional sensor can be situated in spatially fixed fashion in the working region; alternatively, the additional sensor is an additional sensor carried along with the handling device. In particular, the additional sensor is designed to provide fine resolution data, the fine resolution data including the fine resolution of the segment by the additional sensor. The handling assembly includes a final localization module for the more precise determination of the orientation of the station based on the station position, the fine resolution data, the station recognition data, and/or the sensor data. For example, the additional sensor is an additional sensor carried along with the handling device, the additional sensor being carried into the corresponding region by the handling device for the fine resolution, and the additional sensor recording and/or measuring this region, this region being more precisely resolved by the final localization module. This embodiment is based on the idea of providing a possibility with reduced data for defining segments more precisely in a handling assembly.

A further subject matter of the present invention is a method for carrying out at least one work step with a handling device. Using a monitoring sensor, a working region of the handling device is optically monitored. The monitoring sensor provides the optical monitoring as monitoring data. Based on the monitoring data, and based on stored station recognition data, the stations in the working region are detected and/or recognized, and a position is determined as station position for the recognized stations.

A further subject matter of the present invention is a computer program having programming code in order to carry out all steps of the method when the program is executed on a computer and/or on the handling assembly.

Further features, advantages, and effects of the present invention result from the description below of preferred exemplary embodiments of the present invention.

DETAILED DESCRIPTION OF EXAMPLE EMBODIMENTS

Figure 1:
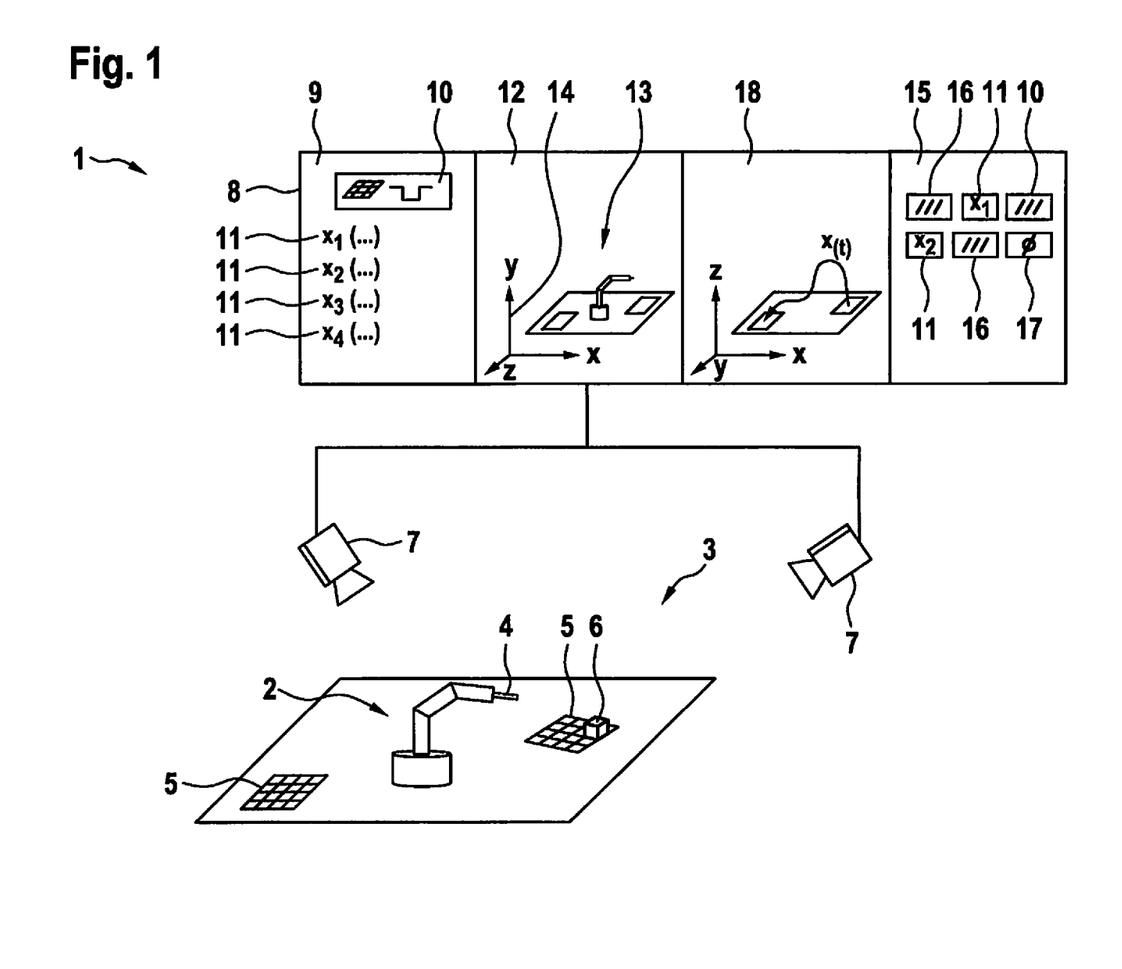
FIG. 1 shows a schematic view of an exemplary embodiment of a handling assembly.

FIG. 1 shows a schematic view of a handling assembly 1. Handling assembly 1 includes a handling device 2. Handling device 2 is situated in a working region 3. Handling device 2 is realized as a multi-axle robot, and is in particular movable and/or pivotable about at least three axles. Handling device 2 has a gripper 4. Gripper 4 is capable of being moved in working region 3 by handling device 2. In particular, gripper 4 is movable in three dimensions in working region 3. Working region 3 is for example a manufacturing plant, a production area, and/or a factory floor segment.

Stations 5 are situated in working region 3. Stations 5 are for example deposition locations for a workpiece 6. For example, one station 5 can be understood as a workpiece source, and another station 5 can be understood as a workpiece end point. For example, one station 5 is a pallet on which the workpieces are situated and/or are capable of being situated. Stations 5 are preferably situated at fixed locations in working region 3; alternatively, stations 5 can be displaced and/or are movable in working region 3 of handling device 2.

Handling device 2 is designed to carry out a work step. The work step can for example be "grasp a workpiece 6 in a first station 5 with gripper 4 and transport workpiece 6 to the other station 5 and put it down there." In addition, handling device 2 can carry out a multiplicity of work steps, for example "grasp workpiece 6 with gripper 4 and process workpiece 6, for example with a drill."

Handling assembly 1 includes two monitoring sensors 7. Monitoring sensors 7 are designed as monitoring cameras. Monitoring sensors 7 are designed for the optical monitoring of working region 3. For this purpose, monitoring sensors 7 record working region 3 in the form of monitoring images. Monitoring sensors 7 are designed to provide monitoring data, the monitoring data including in particular the monitoring images. In particular, monitoring sensors 7 are configured in such a way that the monitoring images have a region of overlap, the region of overlap showing a common region of working region 3. Particularly preferably, monitoring sensors 7 are stereo cameras, these stereo cameras producing a three-dimensional image of working region 3. The monitoring data are provided to a central evaluation unit 8.

Central evaluation unit 8 is designed for example as a computing unit. It can be provided that central evaluation unit 8 is situated in decentralized fashion, for example in a server room; alternatively, evaluation unit 8 is a central evaluation unit 8 integrated for example into handling device 2.

Central evaluation unit 8 includes a localization module 9. The monitoring data are provided to localization module 9. Localization module 9 includes station recognition data 10. Station recognition data 10 include in particular information and/or features that permit the inference of a station in the monitoring data and/or in the monitoring images. For example, station recognition data 10 include information about the geometry, the contours, the contrast, and/or the structure of stations 5 in the monitoring data and/or monitoring images.

Localization module 9 is designed to recognize a station based on the monitoring data and station recognition data 10, and, based thereon, to determine station positions 11 for a recognized station. Station positions 11 are in particular coordinates in a three-dimensional space, and indicate the position of station 5 in working region 3 and/or in the monitoring images. In addition, station positions 11 can also include information about the orientation, for example the angular position.

Central evaluation unit 8 includes a model production module 12. Model production module 12 receives station positions 11 and provides the monitoring data. Model production module 12 is designed to produce a model 13 of working region 3 with stations 5 and handling device 2, based on the monitoring data and the station positions 11. Model 13 is here a three-dimensional model. Preferably, model 13 is a CAD model of working region 3, including stations 5 and handling device 2. For the description of the orientation and/or the positions of stations 5 and/or of handling device 2 in model 13, model production module 12 can include an auxiliary coordinate system 14.

Central evaluation unit 8 has a task definition module 15. Task definition module 15 is designed to define and/or select the working step that is to be carried out on workpiece 6 by handling device 2 in working region 3. In particular, task definition module 15 is designed in such a way that a user can more precisely define and/or select the task and/or the work step on a semantic basis. For example, for this purpose task definition module 15 includes semantic phrases 16, such as "grip," "lift," or "transport." The user can define and/or link these semantic phrases 16 by determining and/or inputting station positions 11. In addition, the user can also complete the task and/or the semantic phrases 16 by determining an end position 17. End position 17 includes, in addition to the coordinates for determining the deposition location, information about the orientation in space, for example three Euler angles. Alternatively, it can be provided that, using task definition module 15, the user can define and/or select the task and/or the work step via optical selection and/or optical marking.

Central evaluation unit 8 includes a path planning module 18. Path planning module 18 is designed, based on the task, the work step, and/or station positions 11, of planning a trajectory X(t), this trajectory X(t) describing the path-time curve of workpiece 6 during the work step. Path planning module 18 is in addition designed to determine trajectory X(t) in such a way that the trajectory X(t) is collision-free, i.e., no collision occurs of workpiece 6 with handling device 2 and/or with objects in working region 3.

In addition, it is provided that central evaluation unit 8 includes a control module, the control module being designed to control handling device 2 by carrying out the work step. For example, the control module controls handling device 2 in such a way that handling device 2 grips workpiece 6 with gripper 4 and transports it along trajectory X(t).

Figure 2A:
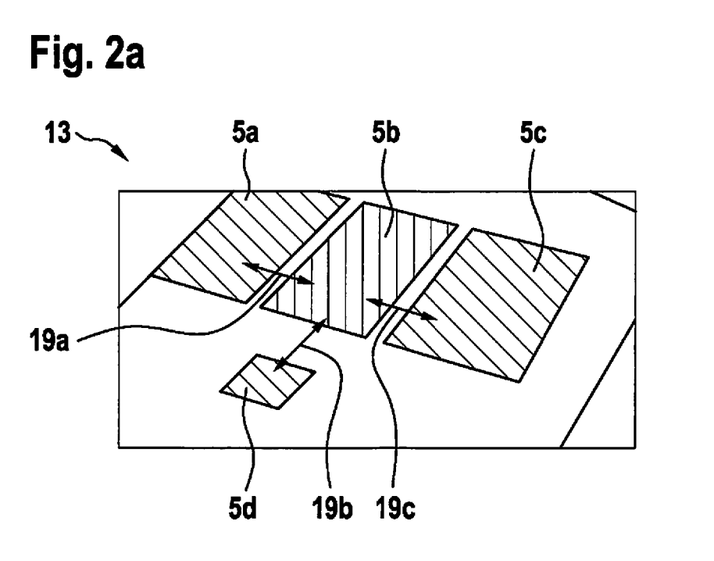
FIGS. 2a and 2b show a schematic view of a display unit of the handling assembly of FIG. 1.

FIG. 2a shows the view of a display unit, model 13 of working region 3 being displayed. Model 13 includes four stations 6a, 6b, 6c, and 6d. Stations 6a, 6c, and 6d form workpiece end points, and station 6b forms a workpiece source. The work step defined and/or selected by this model is a work step based on the workpiece. The work step includes three processes 19a, 19b, and 19c. Processes 19a, 19b, and 19c are processes that can be carried out by a single arm of handling device 2. For example, process 19a is defined as "grasp a workpiece 6 at station 5b and put it down at station 5a." Process 19b is defined for example as "grasp an object 6 at station 5b, transport it to station 5b, and put it down there." Process 19c is defined for example as "grasp workpiece 6 and put it down at station 5c." For example, the work step can be defined in that a user moves a workpiece 6 from one station 5 to another station 5, this work step corresponding to the transfer of the workpiece from the first station to the second station.

Figure 2B:
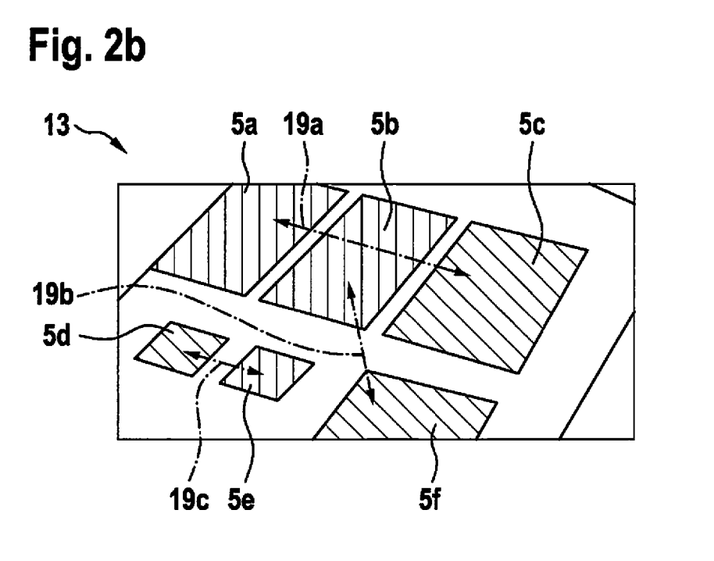

FIG. 2b also shows a model 13 of working region 3, this model including, as workpiece sources, stations 5a, 5b, and 5e. Model 13 includes, as workpiece end points, stations 5c, 5d, and 5f. The work step defined and/or selected by this model is a work step based on a pallet. This means in particular that this work step does not transport and/or process any individual workpiece 6; rather, an entire workpiece pallet is transported and/or processed. In particular, processes 19a, 19b, and 19c for carrying out the work step are processes that are to be carried out using two arms of handling device 2. Process 19a is for example designed to transport a pallet of workpieces 6 from station 6a to station 5c. Process 19b is for example defined so as to transport a pallet from station 5b to station 5f. Process 19c is designed to transport a pallet of workpieces 6 from station 5d to station 5e. In particular, model 13 also illustrates that stations can have different shapes and/or sizes, station 5d being square and much smaller than rectangular station 5a.

Figure 3:
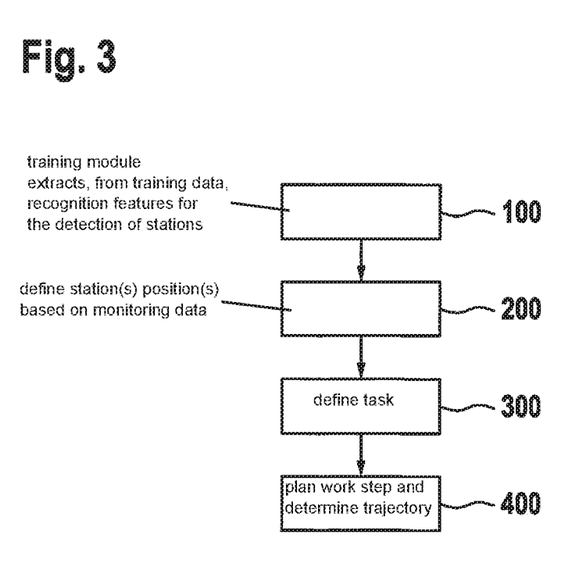
FIG. 3 shows a flow diagram for an exemplary embodiment of the method for carrying out a work step with the handling device.

FIG. 3 shows a flow schema of a method for carrying out a working step with handling device 2. In a training step 100, a large amount of training data is provided to handling assembly 1 and/or to localization module 9. The training data include for example images indicating working regions 3 with stations 5. Here, localization module 9 includes a training module, and, in training step 100, the training module extracts, from the training data, recognition features for the detection of stations in the monitoring data. These recognition features are provided to station recognition data 10. In particular, in this step classifications and/or structures for recognizing the stations are obtained. This step can be carried out for example by a neural network. Training step 100 is followed by a localization step 200. In localization step 200, based on the monitoring data, station position 11 of a station, and/or of a multiplicity of stations, 5 are defined. Here, for example the monitoring data and/or the monitoring images are examined for structures and/or features that indicate stations 5. Based on the stations 5 that are found, the positions and/or orientations of stations 5 are determined as station positions 11.

In a task definition step 300, a person defines a task. In particular, the task is defined and/or selected by the person in a semantic and/or optical selection. For example, for this purpose the user can select previously accomplished tasks, for example "transport and drill workpiece 6." These selected tasks can be defined more precisely in particular using station positions 11, for example "grasp a workpiece from station 5 at station position 11 and drill this workpiece 6."

In a planning step 400, based on the defined task and the station positions, the work step is planned and a trajectory X(T) is determined, this trajectory being a trajectory of the workpiece free of collisions with objects in working region 3. Based on this trajectory X(T), handling device 2 is controlled in order to carry out the work step.

What is claimed is:

1. A handling assembly that operates using training data, the handling assembly comprising:
a robotic arm;
at least one monitoring sensor configured to optically monitor a working region and to provide monitoring data based on the optical monitoring; and
a processor, wherein:
the processor is configured to:
based on the monitoring data, recognize stations that are situated in the working region and to determine a respective station position for each of the stations;
interpret a user definition of a work step that is input as a semantic sentence user-formulated by a user-input of phrases that are (a) user-selected from a plurality of phrases that are predefined for the processor independently of one another, and (b) user-linked together in the semantic sentence with a specification of one or more of the stations; and
based on the interpretation of the user definition of the work step, control the robotic arm to carry out the work step with and/or on a workpiece in the work region at the one or more of the stations; and
the handling assembly has at least one of the following two features (a) and (b):
(a) the processor is configured to execute a training using the training data to determine, based on the training data, recognition features as station recognition data for the recognition of the stations; and
(b) the recognition of the stations is based on a machine learning of station features extracted from the training data, and the interpretation is based on the recognition of the stations.

2. The handling assembly as recited in claim 1, wherein the processor is configured to execute the training using the training data to determine, based on the training data, the recognition features as the station recognition data for the recognition of the stations.

3. The handling assembly as recited in claim 1, wherein the processor is configured to generate a model of the working region based on the recognition of the stations, the recognition of the stations being based on a recognition of one or more of a plurality of the station features predefined for the processor.

4. The handling assembly as recited in claim 3, further comprising:
a display unit configured to display the generated model, the displayed generated model identifying the stations that can be specified in the formulation of the semantic sentence.

5. The handling assembly as recited in claim 1, wherein the processor is configured to perform the control of the robotic arm to carry out the work step based on the respective station position of the one or more stations specified in the semantic sentence.

6. The handling assembly as recited in claim 1, wherein the semantic sentence indicates that one of the one or more stations of the semantic sentence is a site of a start position and another of the one or more stations of the semantic sentence is a site of an end position.

7. The handling assembly as recited in claim 6, wherein the control of the robotic arm is performed based on the semantic sentence so that, after termination of the work step, the workpiece is in the end position.

8. The handling assembly as recited in claim 1, wherein the processor is configured to determine a trajectory of the robotic arm and/or of the workpiece during a carrying out of the work step.

9. The handling assembly as recited in claim 1, wherein the processor is configured to, based on the monitoring by the at least one monitoring sensor, perform a control of the robotic arm in response to a determined change in the working region.

10. The handling assembly as recited in claim 1, wherein the processor is configured to terminate the work step before completion of the work step in response to recognition of a violation of any of one or more predefined conditions.

11. The handling assembly as recited in claim 1, wherein the at least one sensor is carried along on the robotic arm.

12. The handling assembly as recited in claim 1, wherein the recognition of the stations is based on the machine learning of station features extracted from the training data, and the interpretation is based on the recognition of the stations.

13. The handling assembly as recited in claim 12, wherein the machine learning is performed with a neural network.

14. A method for operating a robotic arm, the method using training data and the method comprising the following steps:
    optically monitoring, using a monitoring sensor, a working region to thereby generate monitoring data;
    providing, by the monitoring sensor, the monitoring data to a processor;
    based on the monitoring data, the processor recognizing stations that are situated in the working region and determining a respective station position for each of the recognized stations;
    interpreting, by the processor, a user definition of a work step that is input as a semantic sentence user-formulated by a user-input of phrases that are (a) user-selected from a plurality of phrases that are predefined for the processor independently of one another, and (b) user-linked together in the semantic sentence with a specification of one or more of the stations; and
    based on the interpretation of the user definition of the work step, controlling, by the processor, the robotic arm to carry out the work step with and/or on a workpiece in the work region at the one or more of the stations;
    wherein the method has at least one of the following two features (a) and (b):
    (a) the method further comprises executing, by the processor, a training using the training data to determine, based on the training data, recognition features as station recognition data for the recognition of the stations; and
    (b) the recognition of the stations is based on a machine learning of station features extracted from the training data, and the interpretation is based on the recognition of the stations.

15. A non-transitory computer-readable storage medium on which is stored a computer program having program code that is executable by a computer and that, when executed by the computer, causes the computer to perform a method that uses training data and that includes the following steps:
    optically monitoring, using a monitoring sensor, a working region;
    based on the monitoring, recognizing stations that are situated in the working region and determining a respective station position for each of the recognized stations;
    interpreting a user definition of a work step that is input as a semantic sentence user-formulated by a user-input of phrases that are (a) user-selected from a plurality of phrases that are predefined for a processor independently of one another, and (b) user-linked together in the semantic sentence with a specification of one or more of the stations; and
    based on the interpretation of the user definition of the work step, controlling a robotic arm to carry out the work step with and/or on a workpiece in the work region at the one or more of the stations;
    wherein the method has at least one of the following two features (a) and (b):
    (a) the method further comprises executing, by the processor, a training using the training data to determine, based on the training data, recognition features as station recognition data for the recognition of the stations; and
    (b) the recognition of the stations is based on a machine learning of station features extracted from the training data, and the interpretation is based on the recognition of the stations.

* * * * *